United States Patent
Yin et al.

(10) Patent No.: US 12,045,729 B2
(45) Date of Patent: Jul. 23, 2024

(54) NEURAL NETWORK COMPRESSION METHOD, APPARATUS AND DEVICE, AND STORAGE MEDIUM

(71) Applicant: INSPUR SUZHOU INTELLIGENT TECHNOLOGY CO., LTD., Jiangsu (CN)

(72) Inventors: Wenfeng Yin, Jiangsu (CN); Gang Dong, Jiangsu (CN); Yaqian Zhao, Jiangsu (CN); Qichun Cao, Jiangsu (CN); Lingyan Liang, Jiangsu (CN); Haiwei Liu, Jiangsu (CN); Hongbin Yang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/005,620

(22) PCT Filed: Jan. 25, 2021

(86) PCT No.: PCT/CN2021/073498
§ 371 (c)(1),
(2) Date: Jan. 16, 2023

(87) PCT Pub. No.: WO2022/027937
PCT Pub. Date: Feb. 10, 2022

(65) Prior Publication Data
US 2023/0297846 A1    Sep. 21, 2023

(30) Foreign Application Priority Data
Aug. 6, 2020    (CN) .......................... 202010783365.1

(51) Int. Cl.
G06N 3/09       (2023.01)
G06N 3/0895     (2023.01)
G06N 3/0985     (2023.01)

(52) U.S. Cl.
CPC ......... *G06N 3/0985* (2023.01); *G06N 3/0895* (2023.01)

(58) Field of Classification Search
CPC ........................... G06N 3/0985; G06N 3/0895
See application file for complete search history.

(56) References Cited

U.S. PATENT DOCUMENTS

2018/0060722 A1* 3/2018 Hwang ................... G06N 3/045
2018/0260695 A1* 9/2018 Majumdar ............. G06N 3/084
(Continued)

FOREIGN PATENT DOCUMENTS

CN   108510083 A   9/2018
CN   111008693 A   4/2020
(Continued)

OTHER PUBLICATIONS

Zhang et al., MetaAMC: meta learning and AutoML for model compression, Jun. 2020 (Year: 2020).*
(Continued)

*Primary Examiner* — Omar F Fernandez Rivas
*Assistant Examiner* — Tri T Nguyen
(74) *Attorney, Agent, or Firm* — Dennemeyer & Associates LLC; Victoria Friedman

(57) ABSTRACT

A neural network compression method whereby forward inference is performed on target data by using a target parameter sharing network to obtain an output feature map of the last convolutional module, a channel related feature is extracted from the output feature map, the extracted channel related feature and a target constraint condition are input into a target meta-generative network, and an optimal network
(Continued)

architecture under the target constraint condition is predicted by using the target meta-generative network to obtain a compressed neural network model.

20 Claims, 9 Drawing Sheets

(56) References Cited

U.S. PATENT DOCUMENTS

2019/0034798 A1* 1/2019 Yu .................... G06N 3/045
2019/0147298 A1* 5/2019 Rabinovich ........... G06N 3/04
                                                    382/157

FOREIGN PATENT DOCUMENTS

| CN | 111382863 A | 7/2020 |
| CN | 111967594 A | 11/2020 |
| WO | 2020131968 A1 | 6/2020 |

OTHER PUBLICATIONS

Liu et al., "MetaPruning: Meta Learning for Automatic Neural Network Channel Pruning", 2019 (Year: 2019).*
International Search Report for PCT/CN2021/073498 mailed on May 8, 2021.

* cited by examiner

NEURAL NETWORK COMPRESSION METHOD, APPARATUS AND DEVICE, AND STORAGE MEDIUM

CROSS-REFERENCE TO RELATED APPLICATIONS

This is a 35 U.S.C. 371 National Stage Patent Application of International Application No. PCT/CN2021/073498, filed Jan. 25, 2021, which claims priority to Chinese application 202010783365.1, filed Aug. 6, 2020, each of which is hereby incorporated by reference in its entirety.

The present disclosure claims priority to China Patent Application No. 202010783365.1, filed on Aug. 6, 2020 in China National Intellectual Property Administration and entitled "Neural Network Compression Method, Apparatus and Device, and Storage Medium", which is hereby incorporated by reference in its entirety.

TECHNICAL FIELD

The present disclosure relates to the technical field of computer application, in particular, to a neural network compression method, apparatus and device, and a storage medium.

BACKGROUND

With rapid development of computer technologies, neural network technologies have been gradually developed, and more and more attentions are paid to neural architecture search (NAS). The NAS belongs to a branch of the field of Automatic Machine Learning (AutoML). Parameter optimization of various neural network architectures is discussed, such as selection and combination of architecture parameters such as the type of an operator of each layer and the size of a convolution kernel, and a network architecture with the best performance under specific requirements, such as a limited computation load or a limited inference latency, is found. Performance evaluation is a basic part of the NAS, which guides a search process of the NAS.

At present, most NASs are based on an evolutionary algorithm, as shown in FIG. 1. The overall process is as follows: after candidate architectures are generated, performing inference by a parameter sharing network, screening architectures, optimizing the candidate architectures, determining whether end conditions are satisfied, obtaining the best architecture if the end conditions are satisfied; and repeatedly performing inference by the parameter sharing network if the end conditions are not satisfied. In this method, candidate network architecture generation, model inference, candidate network architecture screening, optimization and other operations need to be iteratively performed for multiple times, so that a large computation load is required, and a long latency is generated. In addition, when neural network compression is performed according to different resource constraint requirements, such computationally intensive NAS processing needs to be performed, which is not conducive to flexible deployment of a model compression method.

SUMMARY

A neural network compression method, apparatus and device, and a storage medium are provided, which may optimize a performance evaluation process of NAS, reduce the computation load of the performance evaluation process and achieve flexible neural network compression.

In order to solve the above technical problems, the following technical solution is provided.

A neural network compression method is provided, including:
  performing forward inference on target data by using a pre-trained target parameter sharing network to obtain an output feature map of a last convolutional module of the target parameter sharing network;
  extracting a channel related feature from the output feature map of the last convolutional module of the target parameter sharing network;
  inputting the extracted channel related feature and a target constraint condition into a target meta-generative network of a pre-trained target weakly supervised meta-learning framework; and
  predicting an optimal network architecture under the target constraint condition by using the target meta-generative network to obtain a compressed neural network model.

In some exemplary implementations of the present disclosure, the target weakly supervised meta-learning framework comprises the target meta-generative network and a target meta-evaluation network connected with the target meta-generative network; and supervised information of the target meta-generative network is from gradient information of the target meta-evaluation network.

In some exemplary implementations of the present disclosure, the target parameter sharing network and the target weakly supervised meta-learning framework are obtained by following operations:
  determining a target neural network model and an initial weakly supervised meta-learning framework, wherein the initial weakly supervised meta-learning framework comprises an initial meta-evaluation network and an initial meta-generative network;
  controlling the target neural network model to perform learning at a training stage;
  controlling the initial meta-evaluation network and the initial meta-generative network to perform learning at a validation stage; and
  repeatedly performing the operations of controlling the target neural network model to perform learning at the training stage and controlling the initial meta-evaluation network and the initial meta-generative network to perform learning at the validation stage until a set first end condition is satisfied, so as to obtain the target parameter sharing network and the target weakly supervised meta-learning framework.

In some exemplary implementations of the present disclosure, the target parameter sharing network and the target weakly supervised meta-learning framework are obtained by following operations:
  determining a target neural network model and an initial weakly supervised meta-learning framework, wherein the initial weakly supervised meta-learning framework comprises an initial meta-evaluation network and an initial meta-generative network;
  performing parameter sharing training on the target neural network model to obtain the target parameter sharing network;
  controlling the initial meta-evaluation network and the initial meta-generative network to perform learning at a validation stage; and
  repeatedly performing the operation of controlling the initial meta-evaluation network and the meta-generative network to perform learning at the validation stage until a set second end condition is satisfied, so as to obtain the target weakly supervised meta-learning framework.

In some exemplary implementations of the present disclosure, the initial meta-evaluation network is controlled to perform learning at the validation stage by following operations:

generating a set of initial neural network architecture;
predicting a weight parameter of a last convolutional module of the target neural network model by using the initial meta-evaluation network according to the initial neural network architecture;
constructing a replacement convolutional module for the last convolutional module of the target neural network model by using the initial meta-evaluation network, wherein the replacement convolutional module takes a weight parameter predicted by the initial meta-evaluation network as a weight and takes input data of the last convolutional module of the target neural network model as an input;
determining a loss function using an output feature map of the replacement convolutional module; and
calculating a gradient according to the loss function by using the initial meta-evaluation network, and performing parameter update.

In some exemplary implementations of the present disclosure, determining the loss function using the output feature map of the replacement convolutional module includes:

inputting the output feature map of the replacement convolutional module into a classifier of the target neural network model to obtain a classification error;
calculating a mean square error between the output feature map of the replacement convolutional module and an output feature map of the last convolutional module of the target neural network model; and
determining the loss function according to the classification error and the mean square error.

In some exemplary implementations of the present disclosure, the initial meta-generative network is controlled to perform learning at the validation stage by following operations:

performing forward inference by using the target neural network model to obtain an output feature map of a last convolutional module of the target neural network model;
extracting a channel related feature from the output feature map of the last convolutional module of the target neural network model;
inputting the extracted channel related feature and a current constraint condition into the initial meta-generative network;
predicting an optimal network architecture under the current constraint condition by using the initial meta-generative network, and inputting the optimal network architecture into the initial meta-evaluation network; and
acquiring a loss function of the optimal network architecture under the current constraint condition by using the initial meta-evaluation network, and backward transferring gradient information, so that the initial meta-generative network performs gradient computation and parameter update on parameters of the initial meta-generative network based on the gradient information.

In some exemplary implementations of the present disclosure, a network architecture of each of the target meta-evaluation network and the target meta-generative network contains two fully-connected layers, and an input layer of the target meta-generative network and an output layer of the target meta-evaluation network adopt a parameter sharing mechanism.

A neural network compression apparatus is provided, including:

a feature map obtaining unit, configured to perform forward inference on target data by using a pre-trained target parameter sharing network to obtain an output feature map of a last convolutional module of the target parameter sharing network;
a feature extraction unit, configured to extract a channel related feature from the output feature map of the last convolutional module of the target parameter sharing network;
a feature inputting unit, configured to input the extracted channel related feature and a target constraint condition into a target meta-generative network of a pre-trained target weakly supervised meta-learning framework; and
a compressed model obtaining module, configured to predict an optimal network architecture under the target constraint condition by using the target meta-generative network to obtain a compressed neural network model.

A neural network compression device is provided, including:

a memory, configured to store a computer program; and
a processor, configured to implement, when executing the computer program, the operations of any neural network compression method above.

A computer-readable storage medium is provided. The computer-readable storage medium stores a computer program; and the computer program, when executed by a processor, implements the operations of any neural network compression method above.

By applying the technical solutions provided by the embodiments of the present disclosure, forward inference is performed on target data by using a target parameter sharing network to obtain an output feature map of a last convolutional module of the target parameter sharing network; a channel related feature is extracted from the output feature map; the extracted channel related feature and a target constraint condition are input into a target meta-generative network of a pre-trained target weakly supervised meta-learning framework; and an optimal network architecture under the target constraint condition is predicted by using the target meta-generative network to obtain a compressed neural network model. A high-performance compressed network architecture under a specified target constraint condition may be generated in inference of a single batch of data. The computation load of the performance evaluation process of NAS may be reduced, and the speed of searching a high-performance neural network architecture may be increased. A satisfactory neural network architecture may be generated as a compressed network model under each different resource constraint, and flexible neural network compression may be achieved.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are only some embodiments of the present disclosure. Those having ordinary skill in the art also can acquire other drawings according to the provided drawings without creative work.

DETAILED DESCRIPTION

Figure 1:
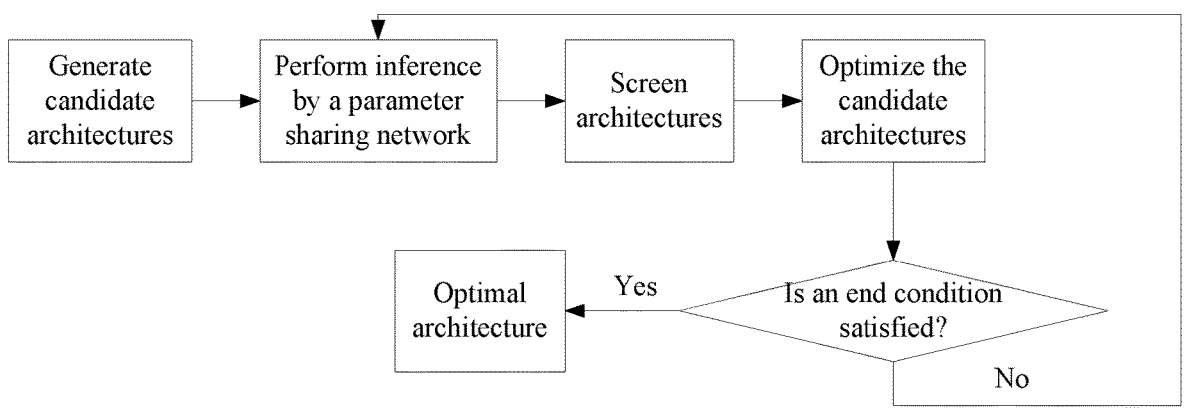
FIG. 1 is a schematic diagram of an evolutionary algorithm-based NAS process in the related art.

First, the current related art is briefly described.

The simplest and most direct performance evaluation policy is training each architecture to be evaluated that is sampled by a complete neural network from the very beginning, and then evaluating the performance of each architecture in a validation set. This processing method will cause a waste of computing resources and time cost. An efficient method for accelerating the performance evaluation of NAS is weight sharing. A weight of a new architecture after sampling is initialized by a weight parameter of a pre-trained neural network. For example, one-shot NAS adopts the idea of weight sharing. All sampled sub-architectures share the weight of a common architecture and inherit the weight in a complete network model. The one-shot NAS only needs to train one complete network model, which avoids the training of subnetwork models, thus reducing the computation load in the performance evaluation process. In the one-shot NAS, subtraction is performed starting from a large network. Compared with an original network model, the found subnetwork architecture decreases in terms of the number parameters and the number of network layers, so that the objective of neural network compression may be achieved.

Considering that the field of neural network model compression and the field of NAS overlap, there are studies on joint application of an accelerated search method in the NAS and a neural network model compression method. For example, in a metapruning method, an NAS method based on hypernetworks is combined with a pruning method, thus forming an automatic model compression method. The core of the NAS method based on hypernetworks is to use meta-learning to train a meta network to generate parameters such as a weight or a gradient for another network. In the metapruning method, a subnetwork architecture to be evaluated is given by the evolutionary algorithm-based search method. The meta network is responsible for generating a weight for the subnetwork architecture to be evaluated, and then the performance of the subnetwork architecture may be tested directly in the validation set without retraining. The training of the meta network is meta-learning conducted in a supervised way. A difference between a supervised meta-learning method and an unsupervised meta-learning method is that at a training stage, the supervised meta-learning can use label learning for training, while the unsupervised meta-learning can only acquire unlabeled training data. At a testing stage, in the supervised and unsupervised meta-learning methods, supervised information is required for effective learning.

In the one-shot NAS, the network training and the search process are decoupled and serialized. After a complete network model training, various search policies may be used to repeatedly search for the best network architecture to satisfy different constraint conditions. Although the computation load of model retraining is eliminated through weight sharing, the performance evaluation process still requires many model inference computations, so as to select a network architecture with the best performance, and the computation load for model inference does not decrease. In addition, it is found in an experiment that each subnetwork architecture needs to be verified for many times before testing to restore the accuracy. The computation load of the performance evaluation process of the NAS is still large.

Figure 2:
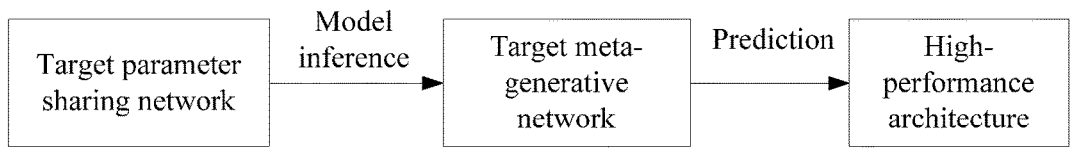
FIG. 2 is a schematic diagram of a weakly supervised meta-learning-based NAS process in the embodiments of the present disclosure.

In view of this, the embodiments of the present disclosure provide a neural network compression method, which is based on a target weakly supervised meta-learning framework. As shown in FIG. 2, a high-performance network architecture may be generated only by inference based on a single batch of target data, which may achieve fast neural network model compression and reduce the computation load in the performance evaluation process. That is, in the embodiments of the present disclosure, forward inference is only required to be performed in two operations, and no iteration is needed. One operation is that a target parameter sharing network performs forward inference to output a feature map of the last convolutional module, and input data of a target meta-generative network is constructed according to the output feature map and a target constraint condition. The other operation is that the target meta-generative network outputs a high-performance neural network architecture prediction result that satisfies the target constraint condition.

In order to make those having ordinary skill in the art better understand the solutions of the embodiments of the present disclosure, the present disclosure is further described in detail below with reference to the accompanying drawings and exemplary implementations. Apparently, the described embodiments are merely a part of the embodiments of the present disclosure and not all the embodiments. Based on the embodiments in the present disclosure, all other embodiments obtained by those having ordinary skill in the art without creative work all fall within the protection scope of the present disclosure.

Figure 3:
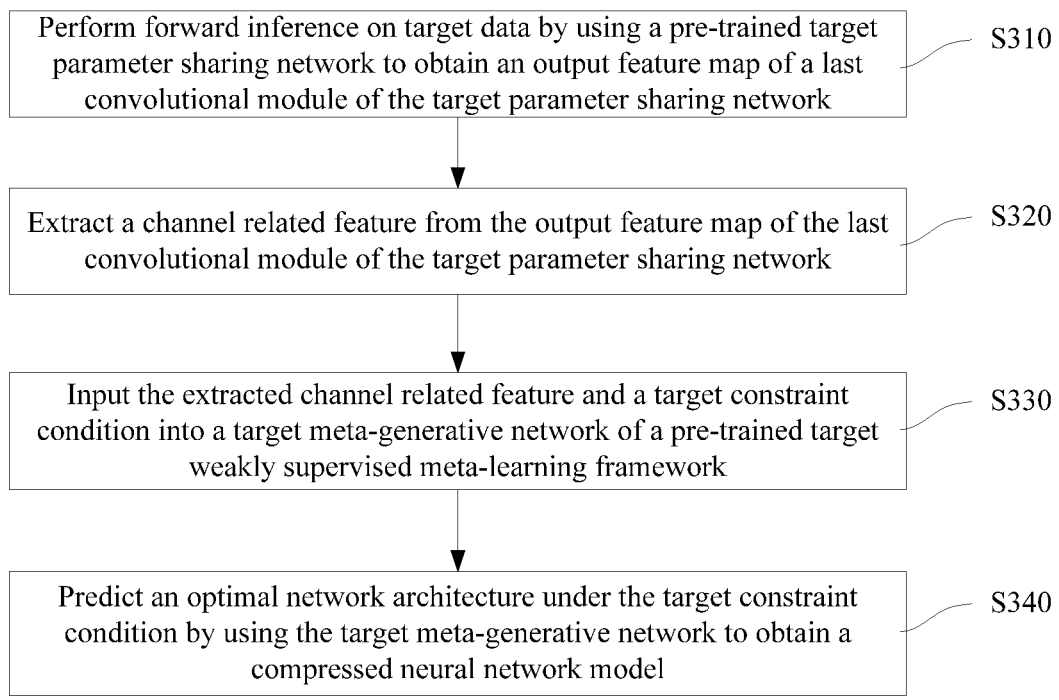
FIG. 3 is a flow chart of implementation of a neural network compression method in the embodiments of the present disclosure.

Referring to FIG. 3, which is a flow chart of implementation of a neural network compression method provided by the embodiments of the present disclosure, the method may include following operations.

At S310, forward inference is performed on target data by using a pre-trained target parameter sharing network to obtain an output feature map of a last convolutional module of the target parameter sharing network.

In the embodiments of the present disclosure, the target parameter sharing network may be obtained by pre-training. The target data may be a set of image data currently required to be classified.

In practical applications, the target data may be input into the target parameter sharing network, and the output feature map of the last convolutional module of the target parameter sharing network may be obtained by performing the forward inference on the target data by using the target parameter sharing network.

The last convolutional module of the target parameter sharing network may include a convolution layer, a batch normalization layer and an activation layer.

At S320, a channel related feature is extracted from the output feature map of the last convolutional module of the target parameter sharing network.

The channel related feature may be extracted from the output feature map after the output feature map of the last convolutional module of the target parameter sharing network is obtained.

In some exemplary implementations, the channel related feature may be a maximum value of the feature map on each channel, that is, the maximum value of each feature submap (with a dimension of H*W) after a feature map tensor (which is a four-dimensional tensor with a dimension of N*C*H*W) of N input data is split along channel C, thus finally forming an N*C*1-dimensional feature tensor.

At S330, the extracted channel related feature and a target constraint condition are input into a target meta-generative network of a pre-trained target weakly supervised meta-learning framework.

The target weakly supervised meta-learning framework includes the target meta-generative network and a target meta-evaluation network connected with the target meta-generative network; and supervised information of the target meta-generative network is from gradient information of the target meta-evaluation network.

In the embodiments of the present disclosure, the target weakly supervised meta-learning framework may be obtained by pre-training. The target weakly supervised meta-learning framework includes the target meta-generative network and the target meta-evaluation network connected with the target meta-generative network. The target weakly supervised meta-learning framework may be obtained by controlling the learning of an initial weakly supervised meta-learning framework. The initial weakly supervised meta-learning framework may include an initial meta-generative network and an initial meta-evaluation network. The target meta-generative network and the target meta-evaluation network may be obtained by controlling the initial meta-generative network and the initial meta-evaluation network to perform learning, so that the target weakly supervised meta-learning framework is obtained. The supervised information of the target meta-generative network is from the gradient information of the target meta-evaluation network.

After the channel related feature is extracted from the output feature map of the last convolutional module of the target parameter sharing network, the extracted channel related feature and target constraint condition may be input into the target meta-generative network of the target weakly supervised meta-learning framework. The target constraint condition may be upper and lower limits of a channel compression ratio of each layer corresponding to a Floating Point Operations Per second (FLOPs) limit or a latency limit.

At S340, an optimal network architecture under the target constraint condition is predicted by using the target meta-generative network to obtain a compressed neural network model.

The target meta-generative network is obtained by pre-training. After the channel related feature extracted from the output feature map of the last convolutional module of the target parameter sharing network and the target constraint condition are input into the target meta-generative network, the optimal network architecture under the target constraint condition may be predicted by using the target meta-generative network to obtain the compressed neural network model.

By applying the method provided by the embodiments of the present disclosure, forward inference is performed on target data by using a target parameter sharing network to obtain an output feature map of a last convolutional module of the target parameter sharing network; a channel related feature is extracted from the output feature map; the extracted channel related feature and a target constraint condition are input into a target meta-generative network of a pre-trained target weakly supervised meta-learning framework; and an optimal network architecture under the target constraint condition is predicted by using the target meta-generative network to obtain a compressed neural network model. A high-performance compressed network architecture under a specified target constraint condition may be generated in inference of a single batch of data. The computation load of the performance evaluation process of NAS may be reduced, and the speed of searching a high-performance neural network architecture may be increased. A satisfactory neural network architecture may be generated as a compressed network model under each different resource constraint, and flexible neural network compression may be achieved.

In the embodiments of the present disclosure, the target parameter sharing network and the target weakly supervised meta-learning framework may be obtained by following operations.

At operation I, a target neural network model and an initial weakly supervised meta-learning framework are determined, wherein the initial weakly supervised meta-learning framework includes an initial meta-evaluation network and an initial meta-generative network.

At operation II, the target neural network model is controlled to perform learning at a training stage.

At operation III, the initial meta-evaluation network and the initial meta-generative network are controlled to perform learning at a validation stage.

At operation IV, the operations of controlling the target neural network model to perform learning at the training stage and controlling the initial meta-evaluation network and the initial meta-generative network to perform learning at the validation stage are repeatedly performed until a set first end condition is satisfied, so as to obtain the target parameter sharing network and the target weakly supervised meta-learning framework.

For the convenience of description, the above four operations are described in a complete subflow.

The target neural network model and the initial weakly supervised meta-learning framework are determined first, wherein the initial weakly supervised meta-learning framework includes the initial meta-evaluation network and the initial meta-generative network. The target neural network model may be an existing neural network model, such as resnet, mobilenet and shufflenet, and the initial architecture is a non-compressed model architecture.

The target neural network model is then controlled to perform learning at the training stage. The target neural network model may be trained using a slimmable neural networks (SNN) technology or a universally slimmable network (USN) or a once for all (OFA) technology. Performance validation may further be performed on the basis of using the USN technology.

Figure 4:
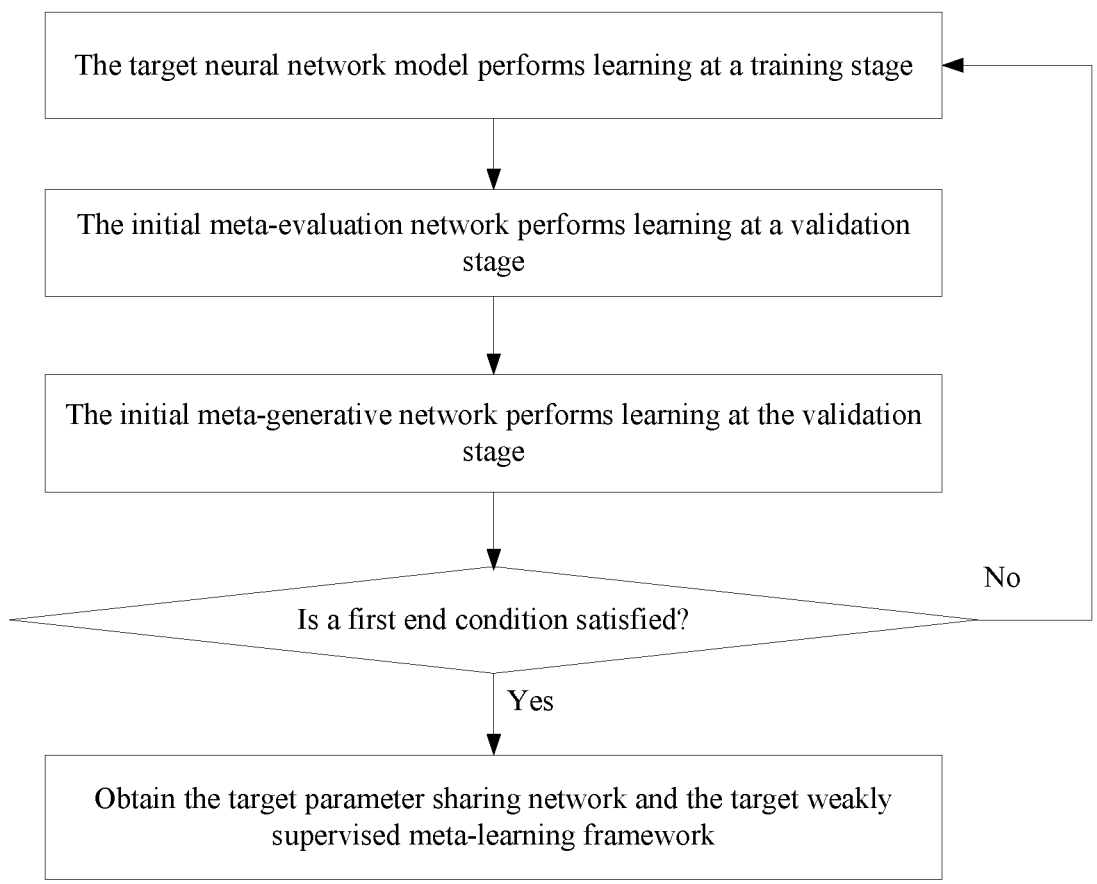
FIG. 4 is a schematic diagram of a synchronous training process of an initial weakly supervised meta-learning framework and a target neural network model in the embodiments of the present disclosure.

The initial meta-evaluation network is controlled to perform learning at the validation stage, and the initial meta-generative network is controlled to perform learning at the validation stage. The operations of controlling the target neural network model to perform learning at the training stage and controlling the initial meta-evaluation network and the initial meta-generative network to perform learning at the validation stage are repeated until the set first end condition is satisfied, so as to obtain the target parameter sharing network, the target meta-evaluation network and the target meta-generative network, thereby obtaining the target weakly supervised meta-learning framework, as shown in FIG. 4. The initial meta-generative network and the initial meta-evaluation network are trained alternately, and the training of the initial meta-generative network depends on the initial meta-evaluation network.

Test data at the testing stage and validation data at the validation stage may be data in the same dataset.

In this process, the initial weakly supervised meta-learning framework and the target neural network model are trained synchronously, and the target weakly supervised meta-learning framework and the target parameter sharing network are obtained simultaneously, which can save the training time.

A meta-learning method implemented by the meta-learning framework of the embodiments of the present disclosure is weakly supervised meta-learning, which is the same as the unsupervised meta-learning in that unlabeled data is used in training, but is different from the unsupervised meta-learning in the following aspects. In the unsupervised meta-learning method, the unlabeled data is converted into labeled data for learning. For example, in Clustering to Automatically Construct Tasks for Unsupervised meta-learning (CACTUs), a clustering method is used to construct a pseudo label for the unlabeled data, and a supervised meta-learning method such as Model-Agnostic Meta-Learning (MAML) is used to complete the learning task. In the embodiments of the present disclosure, the supervised information of one meta network in the meta-learning framework is from the gradient information of another meta network, instead of label data. That is, the initial meta-generative network uses a gradient fed back by the initial meta-evaluation network as the supervised information for weakly supervised learning, and the discriminability of a compressed network is maintained by knowledge distilling in the supervised learning of the initial meta-evaluation network.

In another embodiment of the present disclosure, the target parameter sharing network and the target weakly supervised meta-learning framework may be obtained by following operations.

At operation I, a target neural network model and an initial weakly supervised meta-learning framework are determined, wherein the initial weakly supervised meta-learning framework includes an initial meta-evaluation network and an initial meta-generative network.

At operation II, parameter sharing training is performed on the target neural network model to obtain the target parameter sharing network.

At operation III, the initial meta-evaluation network and the initial meta-generative network are controlled to perform learning at a verification stage.

At operation IV, the operation of controlling the initial meta-evaluation network and the meta-generative network to perform learning at the validation stage is repeatedly performed until a set second end condition is satisfied, so as to obtain the target weakly supervised meta-learning framework.

For the convenience of description, the above four operations are described in a complete subflow.

The target neural network model and the initial weakly supervised meta-learning framework are determined, wherein the initial weakly supervised meta-learning framework includes the initial meta-evaluation network and the initial meta-generative network. The target neural network model may be an existing neural network model, such as resnet, mobilenet and shufflenet, and the initial architecture is a non-compressed model architecture.

The parameter sharing training is performed on the target neural network model, so that the target parameter sharing network may be obtained. The target neural network model may be trained using an SNN technology, and the obtained network is the target parameter sharing network, or the target neural network model may be trained using a USN or OFA technology. Performance validation may further be performed on the basis of using the USN technology.

The initial meta-evaluation network is controlled to perform learning at the validation stage, and the initial meta-generative network to perform learning at the validation stage. The operations of controlling the initial meta-evaluation network and the initial meta-generative network to perform learning at the validation stage are repeated until the set second end condition is satisfied, so as to obtain the target meta-evaluation network and the target meta-generative network, thus obtaining the target weakly supervised meta-learning framework. The initial meta-generative network and the initial meta-evaluation network are trained alternately, and the training of the initial meta-generative network depends on the initial meta-evaluation network.

Figure 5:
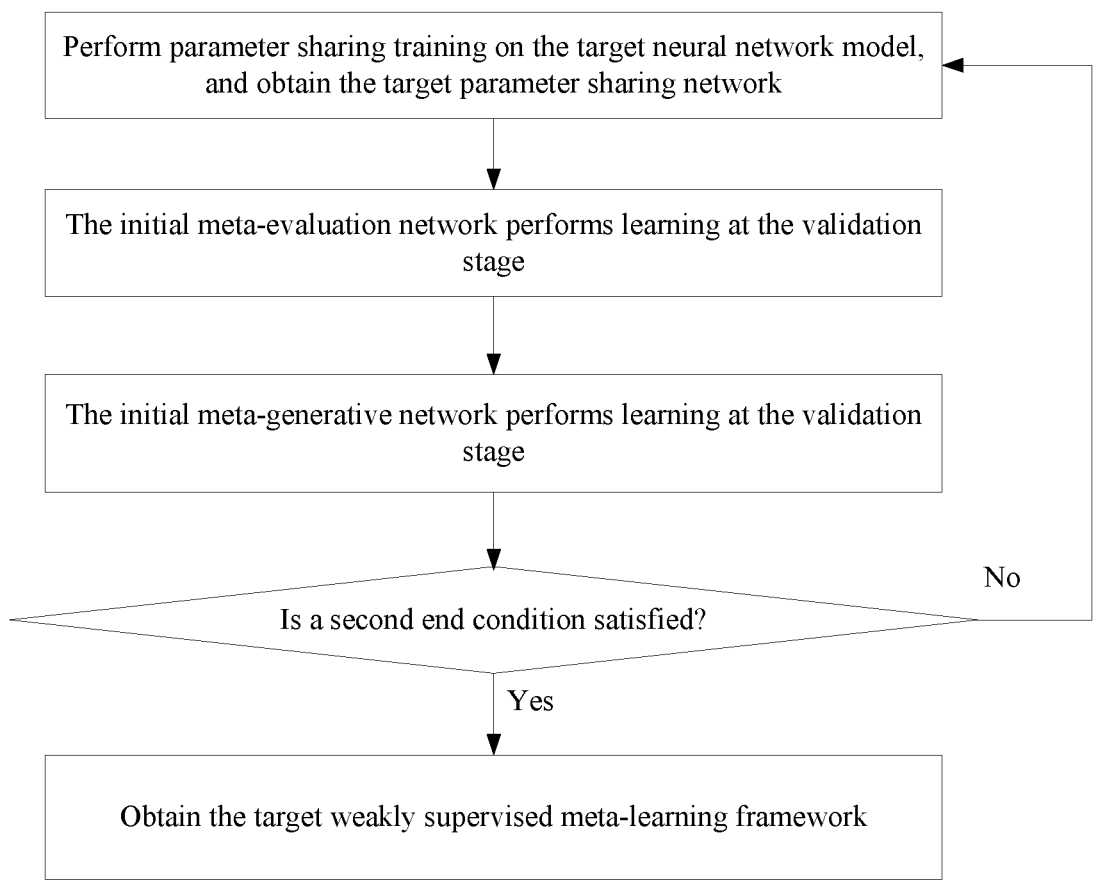
FIG. 5 is a schematic diagram of an asynchronous training process of an initial weakly supervised meta-learning framework and a target neural network model in the embodiments of the present disclosure.

In this process, the initial weakly supervised meta-learning framework and the target neural network model are trained asynchronously, and the target weakly supervised meta-learning framework and the target parameter sharing network are obtained, as shown in FIG. 5. Parameter sharing training is first performed on the target neural network model to obtain the target parameter sharing network, which facilitates the subsequent learning of the initial meta-evaluation network and the initial meta-generative network, and the flexibility is higher.

Test data at the testing stage and validation data at the validation stage may be data in the same dataset.

The first end condition and the second end condition may be set and adjusted according to actual situations, such as taking an accuracy meeting setting requirements as an end condition.

That is, in the embodiments of the present disclosure, the training process of the initial weakly supervised meta-learning framework may be performed synchronously or asynchronously with the training of the target neural network model. The synchronous training method will not interfere with the training of the target neural network model, and the asynchronous training method may meet a demand of the target neural network model for migration between different datasets.

In the embodiments of the present disclosure, the initial meta-evaluation network may be controlled to perform learning at the verification stage by following operations.

At operation I, a set of initial neural network architecture is generated.

At operation II, a weight parameter of a last convolutional module of the target neural network model is predicted by using the initial meta-evaluation network according to the initial neural network architecture.

At operation III, a replacement convolutional module is constructed for the last convolutional module of the target neural network model by using the initial meta-evaluation network, wherein the replacement convolutional module takes a weight parameter predicted by the initial meta-evaluation network as a weight and takes input data of the last convolutional module of the target neural network model as an input.

At operation IV, a loss function is determined using an output feature map of the replacement convolutional module.

At operation V, a gradient is calculated according to the loss function by using the initial meta-evaluation network, and parameter update is performed.

For the convenience of description, the above five operations are described in a complete subflow.

In the embodiments of the present disclosure, a set of initial neural network architecture may be generated first. For example, a set of initial neural network architecture may be randomly generated. That is, combined data of different channel compression ratios of each layer is constructed. The weight parameter of the last convolutional module of the target neural network model may be generated by using the initial meta-evaluation network according to the initial neural network architecture, and a replacement convolutional module is constructed for the last convolutional module of the target neural network model. The replacement convolutional module takes the weight parameter predicted by the initial meta-evaluation of the last convolutional module of the target neural network model as the input. The output feature map of the replacement convolutional module is an approximate estimation of the output feature map of the last convolutional module after the target neural network model adopts the setting of the current initial neural network architecture. The advantage of this processing method is that the target neural network model does not need to perform the forward inference according to the initial neural network architecture, so that the impact of the initial neural network architecture on the output feature map of the last convolutional module. This not only reduces the number of parameters to be predicted, but also avoids re-calculation of the forward inference.

The loss function may be determined using the output feature map of the replacement convolutional module after the replacement convolutional module is constructed. In some exemplary implementations, the output feature map of the replacement convolutional module may be input into a classifier of the target neural network model to obtain a classification error. A mean square error between the output feature map of the replacement convolutional module and an output feature map of the last convolutional module of the target neural network model is calculated. The loss function is determined according to the classification error and mean square error.

That is, after the replacement convolutional module is constructed, on the one hand, the output feature map of the replacement convolutional module may be input to the classifier of the target neural network model, that is, the classification error is obtained in the last fully-connected layer; and on the other hand, the mean square error between the output feature map of the replacement convolutional module and the output feature map of the last convolutional module of the target neural network model may be calculated. The classification error and the mean square error may form a calculation formula of the loss function.

Figure 6:
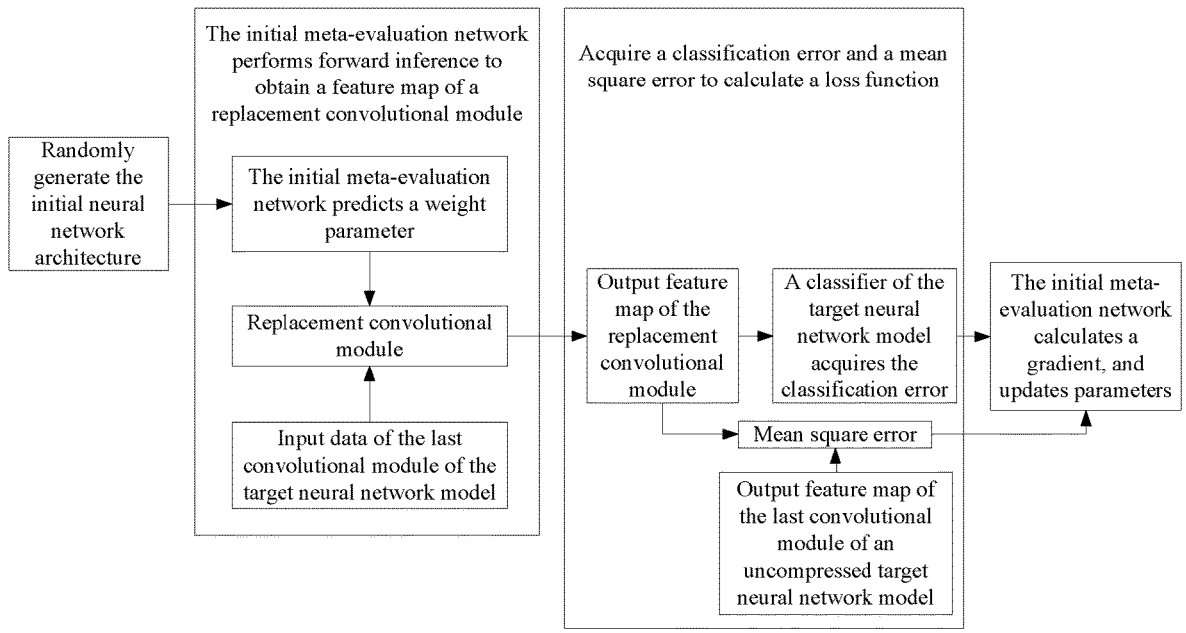
FIG. 6 is a schematic diagram of a training process of an initial meta-evaluation network in the embodiments of the present disclosure.

A gradient may be calculated by using the initial meta-evaluation network according to the loss function, and parameter update is performed. The whole training process is shown in FIG. 6.

In the embodiments of the present disclosure, in order to accelerate the training of the initial weakly supervised meta-learning framework and ensure the discriminability level of the feature map output by the last convolutional module of the predicted network architecture, the initial meta-evaluation network uses the output feature map of the last convolutional module of the target neural network model as reference data for knowledge distilling in a setting of a maximum network width of the target neural network model. That is, the mean square error between the output feature map of the replacement convolutional module and the reference data of each predicted network architecture is taken as a constraint item of a loss function of a meta-evaluation network to guide the learning of the meta-evaluation network.

In the embodiments of the present disclosure, the initial meta-generative network may be controlled to perform learning at the verification stage by following operations.

At operation I, forward inference is performed by using the target neural network model to obtain an output feature map of a last convolutional module of the target neural network model.

At operation II, a channel related feature is extracted from the output feature map of the last convolutional module of the target neural network model.

At operation III, the extracted channel related feature and a current constraint condition are input into the initial meta-generative network.

At operation IV, an optimal network architecture under the current constraint condition is predicted by using the initial meta-generative network, and the optimal network architecture is input into the initial meta-evaluation network.

At operation V, a loss function of the optimal network architecture under the current constraint condition is acquired by using the initial meta-evaluation network, and gradient information is backward transferred, so that the initial meta-generative network performs gradient computation and parameter update on parameters of the initial meta-generative network based on the gradient information.

For the convenience of description, the above five operations are described in a complete subflow.

In the embodiments of the present disclosure, the forward inference is performed by using the target neural network model to obtain the output feature map of the last convolutional module of the target neural network model. The channel related feature may be extracted from the output feature map. The extracted channel related feature and the current constraint condition are used as input data of the initial meta-generative network and input into the initial meta-generative network. The current constraint condition may be upper and lower limits of a channel compression ratio of each layer corresponding to FLOPs limit or a latency limit.

Figure 7:
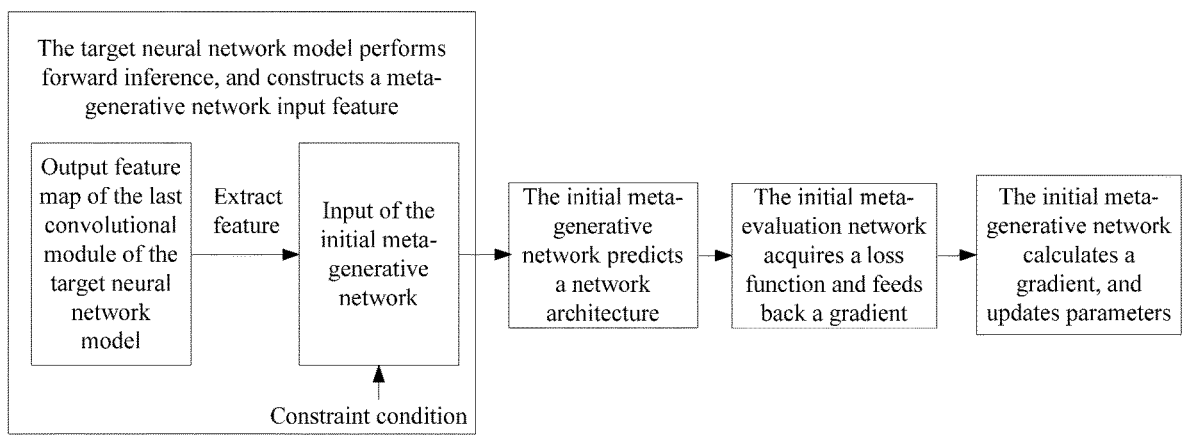
FIG. 7 is a schematic diagram of a training process of an initial meta-generative network in the embodiments of the present disclosure.

The optimal network architecture under the current constraint is predicted by using the initial meta-generative network and input into the initial meta-evaluation network. The loss function of the optimal network architecture under the current constraint condition may be acquired through the initial meta-evaluation network, and the gradient information is backward transferred. The initial meta-generative network receives the gradient information, and performs gradient calculation and parameter update of its own parameters based on the gradient information. The whole training process is shown in FIG. 7.

In the embodiments of the present disclosure, the training of the initial weakly supervised meta-learning framework includes two stages. The first stage is supervised training of a meta network, i.e. the initial meta-evaluation network, for predicting the performance of a network architecture, and the second stage is weakly supervised training of a meta network, i.e. the initial meta-generative network, for generating a high-performance network architecture. The training of the initial weakly supervised meta-learning framework in the embodiment of the present disclosure may be combined with a parameter sharing network training method in the relevant art, for example, with the USN. The weakly supervised meta-learning framework is learned in the embodiments of the present disclosure at the validation stage, and the USN is learned at the training stage. The training of the weakly supervised meta-learning framework in the embodiments of the present disclosure will not interfere with the learning.

The neural network compression method provided by the embodiments of the present disclosure uses meta-learning to mine the correlation between the layers of A neural network, learn a combination rule of the number of channels of each layer of the neural network under different resource constraints, and perform joint optimal decrease on the number of channels of each layer, so as to achieve reasonable allocation of a limited computation load in each layer. Compared with the traditional neural network compression method, which compresses a neural network layer by layer or only compress one layer, ignoring the correlation between the layers. For example, in the NetAdapt method, a neural network model is compressed progressively. An input neural network architecture is compressed for N rounds in each iteration, and only one layer is selected for being compressed and finely adjusted in each round. After N rounds of compressions are completed, a network architecture with the highest accuracy is selected for the next iteration, and the iteration is stopped until the compressed neural network architecture meets requirements for resource constraints. The embodiments of the present disclosure may generate a high-performance compressed network architecture under a given target constraint condition in the inference of a single batch of data, so that the computation load of the performance evaluation process of the NAS may be reduced, and the search for a high-performance neural network architecture may be accelerated. Satisfactory neural network architectures may be generated as compressed network models under each different resource constraint, so that flexible neural network compression may be achieved.

In the embodiments of the present disclosure, the target meta-evaluation network for predicting the performance of a network architecture takes data label and a feature map of a specific output layer of the target parameter sharing network as the supervised information, and the supervised learning is performed through gradient descent, thus generating the target meta-generative network with a high-performance network architecture, which uses the gradient backward transferred by the target meta-evaluation network as the supervised information. Since the information of a network architecture with the best performance under a given constraint condition is unknown, the gradient information of the target meta-generative network does not come from strongly supervised information determined by a real optimal network architecture. The target meta-generative network completes the weakly supervised learning through the gradient descent.

In the embodiments of the present disclosure, based on reducing the computation load of the performance evaluation process of the NAS, by using the target weakly supervised meta-learning framework that can predict a high-performance network architecture under different constraint conditions, iteration processes of model inference and screening may be avoided, and a high-performance network architecture is directly generated from a meta network and serves as a compressed model to achieve a neural network model compression function.

In practical applications, the embodiments of the present disclosure may be deployed in a software platform of a neural network acceleration application based on a Field-Programmable Gate Array (FPGA) or an AI acceleration chip, so as to increase the speed of the NAS process, thereby achieving fast and flexible neural network compression based on the target parameter sharing network, and promoting the implementation and promotion of FPGA-based deep learning in resource-constrained scenarios such as edge computing.

In the embodiments of the present disclosure, the network architecture of each of the target meta-evaluation network and the target meta-generative network contains two fully-connected layers. An input layer of the target meta-generative network and an output layer of the target meta-evaluation network both adopt a parameter sharing mechanism, which can adapt to the variable number of channels of the target parameter sharing network, that is, inputs or outputs of different sizes share a group of weight parameters. A specific input or output size can vary according to a compression ratio adopted by the target parameter sharing network. That is, the number of weights of the input layer of the target meta-generative network and the output layer of the target meta-evaluation network is variable, and different numbers of weights share parameter values.

The target meta-generative network and the initial meta-generative network have the same network architecture, and the target meta-evaluation network and the initial meta-evaluation network have the same network architecture.

Figure 8:
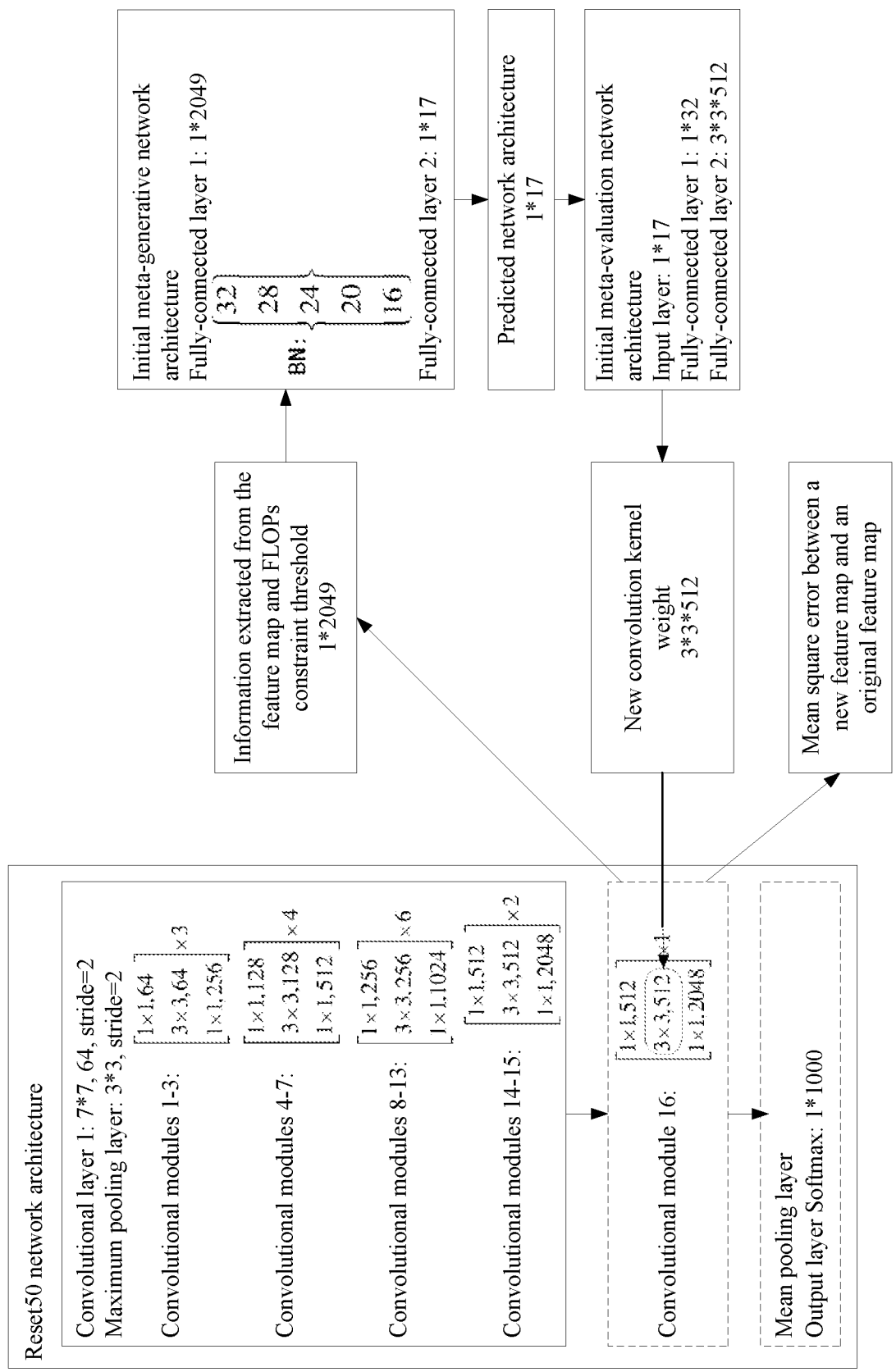
FIG. 8 is a schematic diagram of a network architecture of an initial meta-evaluation network and an initial meta-generative network and a data stream during learning of the initial meta-generative network in the embodiments of the present disclosure.
Figure 9:
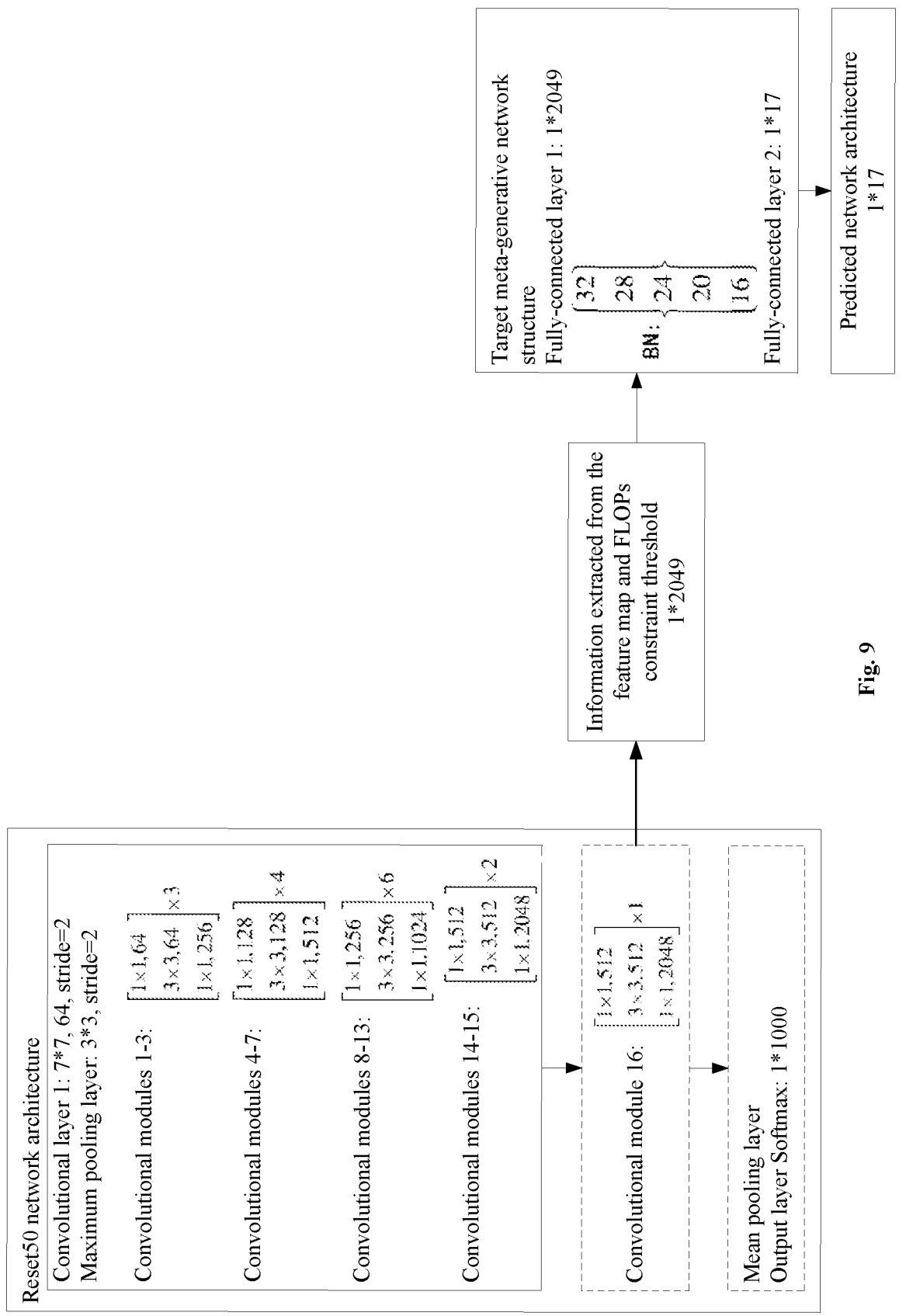
FIG. 9 is a schematic diagram of a data stream during inference by a target meta-generative network in the embodiments of the present disclosure.
Figure 10:
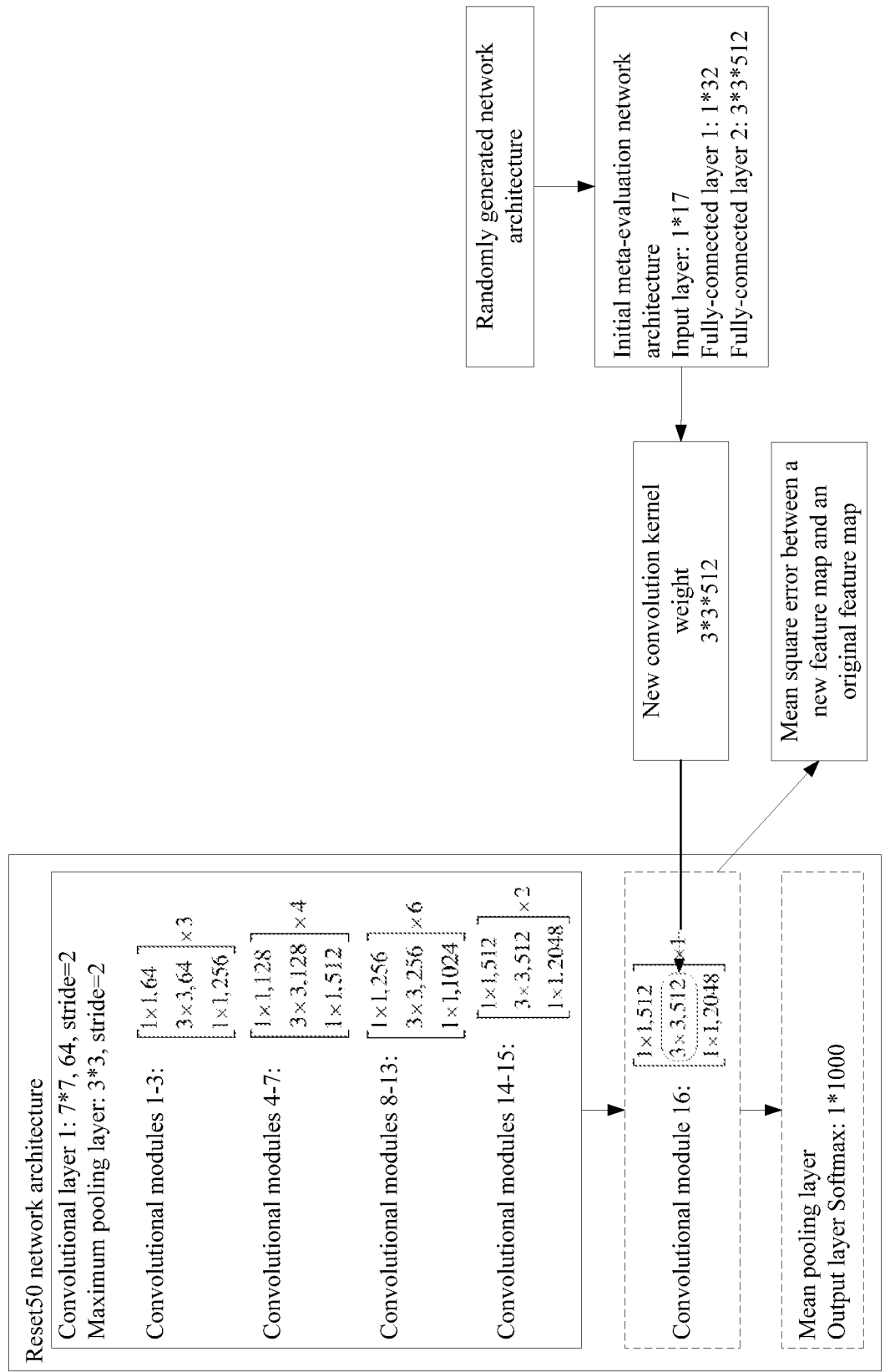
FIG. 10 is a schematic diagram of a data stream during learning of an initial meta-evaluation network in the embodiments of the present disclosure.

In some exemplary embodiments of the present disclosure, the network architecture of the initial meta-evaluation network is composed of two fully-connected (FC) layers. The number of neurons in the input layer of the initial meta-evaluation network may be equal to the number of layers to be compressed in the initial parameter sharing network. The number of neurons in a hidden layer may be set to be 32, and the number of neurons in the output layer is equal to the number of convolution kernel weight parameters of a specified layer in the initial parameter sharing network. As shown in FIGS. 8, 9 and 10, a resnet50 model-based parameter sharing network is taken as an example. Supposing that a total of 17 convolutional modules in a resnet50 model are compressed, the feature map of the last convolutional module of the resnet50 model provides the initial meta-evaluation network with knowledge distilling information, so that the number of neurons in the input layer of the initial meta-evaluation network is 17; the number of neurons in the hidden layer is still 32; and the number of neurons in the output layer is equal to the number of convolution kernel weights in a middle convolutional layer of the last convolutional module, i.e. 3×3×512. Each convolutional module contains three convolutional layers. A convolution kernel weight output by the initial meta-evaluation network corresponds to the second convolutional layer of the last convolutional module of the resnet50 network architecture.

The network architecture of the initial meta-generative network consists of two fully-connected layers and a batch normalization (BN) layer. The BN layer is located between the two fully-connected layers. The number of neurons in the input layer of the initial meta-generative network is equal to the sum of the number of convolution kernel output channels of a specified layer in the initial parameter sharing network and the threshold number of FLOPs constraints. The number of neurons in the hidden layer of the initial meta-generative network is set to be 32. The BN layer here is a list of ordinary BN layers with different input dimensions. The number of neurons in the output layer of the initial meta-generative network is the same as the number of layers to be compressed in the initial parameter sharing network. As shown in FIGS. 8, 9 and 10, a resnet50 model-based parameter sharing network is taken as an example. Supposing that a total of 17 convolutional modules in a resnet50 model are compressed and the threshold number of FLOPs constraints is 1, the feature map of the last convolutional module of the resnet50 model provides the initial meta-evaluation network with input data, so that the number of neurons in the input layer of the initial meta-generative network is 2048+1=2049; the number of neurons in the hidden layer neurons is still 32; and the number of neurons in the output layer is 17. When the number of FLOPs constraints is a value in [1.0, 0.875, 0.75, 0.625, 0.5], the BN layer contains five ordinary BN layers with input data dimensions of [32, 28, 24, 20, 16].

In addition, FIG. 8 shows a data stream during learning of the initial meta-generative network; FIG. 9 shows a data stream during inference by a target meta-generative network; and FIG. 10 shows a data stream during learning of an initial meta-evaluation network.

Corresponding to the above method embodiment, an embodiment of the present disclosure further provides a neural network compression apparatus. The neural network compression apparatus described below may correspondingly refer to the neural network compression method described above.

Figure 11:
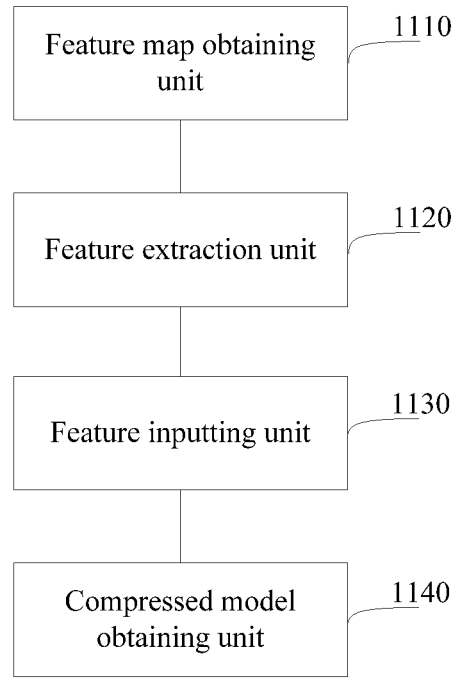
FIG. 11 is a schematic structural diagram of a neural network compression apparatus in the embodiments of the present disclosure.

As shown in FIG. 11, the apparatus may include the following units:
- a feature map obtaining unit 1110, configured to perform forward inference on target data by using a pre-trained target parameter sharing network to obtain an output feature map of a last convolutional module of the target parameter sharing network;
- a feature extraction unit 1120, configured to extract a channel related feature from the output feature map of the last convolutional module of the target parameter sharing network;
- a feature inputting unit 1130, configured to input the extracted channel related feature and a target constraint condition into a target meta-generative network of a pre-trained target weakly supervised meta-learning framework; and
- a compressed model obtaining module 1140, configured to predict an optimal network architecture under the target constraint condition by using the target meta-generative network to obtain a compressed neural network model.

By applying the apparatus provided by the embodiments of the present disclosure, forward inference is performed on target data by using a target parameter sharing network to obtain an output feature map of a last convolutional module of the target parameter sharing network; a channel related feature is extracted from the output feature map; the extracted channel related feature and a target constraint condition are input into a target meta-generative network of a pre-trained target weakly supervised meta-learning framework; and an optimal network architecture under the target constraint condition is predicted by using the target meta-generative network to obtain a compressed neural network model. A high-performance compressed network architecture under a specified target constraint condition may be generated in inference of a single batch of data. The computation load of the performance evaluation process of NAS may be reduced, and the speed of searching a high-performance neural network architecture may be increased. A satisfactory neural network architecture may be generated as a compressed network model under each different resource constraint, and flexible neural network compression may be achieved.

In some exemplary implementations of the present disclosure, the target weakly supervised meta-learning framework comprises the target meta-generative network and a target meta-evaluation network connected with the target meta-generative network; and supervised information of the target meta-generative network is from gradient information of the target meta-evaluation network.

In some exemplary implementations of the present disclosure, the apparatus further includes a first training unit, configured to obtain the target parameter sharing network and the target weakly supervised meta-learning framework by following operations:
- determining the target neural network model and the initial weakly supervised meta-learning framework are determined, wherein the initial weakly supervised meta-learning framework includes the initial meta-evaluation network and the initial meta-generative network;
- controlling the target neural network model to perform learning at a training stage;
- controlling the initial meta-evaluation network and the initial meta-generative network to perform learning at a validation stage; and
- repeatedly performing the operations of controlling the target neural network model to perform learning at the training stage and controlling the initial meta-evaluation network and the initial meta-generative network to perform learning at the validation stage until a set first end condition is satisfied, so as to obtain the target parameter sharing network and the target weakly supervised meta-learning framework.

In some exemplary implementations of the present disclosure, the apparatus further includes a second training unit, configured to obtain the target parameter sharing network and the target weakly supervised meta-learning framework by following operations:
  determining the target neural network model and the initial weakly supervised meta-learning framework are determined, wherein the initial weakly supervised meta-learning framework includes the initial meta-evaluation network and the initial meta-generative network;
  performing parameter sharing training on the target neural network model to obtain the target parameter sharing network;
  controlling the initial meta-evaluation network and the initial meta-generative network to perform learning at a validation stage; and
  repeatedly performing the operation of controlling the initial meta-evaluation network and the meta-generative network to perform learning at the validation stage until a set second end condition is satisfied, so as to obtain the target weakly supervised meta-learning framework.

In some exemplary implementations of the present disclosure, the apparatus further includes a metal-evaluation network learning unit, configured to control the initial meta-evaluation network to perform learning at the validation stage by following operations:
  generating a set of initial neural network architecture;
  predicting a weight parameter of a last convolutional module of the target neural network model by using the initial meta-evaluation network according to the initial neural network architecture;
  constructing a replacement convolutional module for the last convolutional module of the target neural network model by using the initial meta-evaluation network, wherein the replacement convolutional module takes a weight parameter predicted by the initial meta-evaluation network as a weight and takes input data of the last convolutional module of the target neural network model as an input;
  determining a loss function using an output feature map of the replacement convolutional module; and
  calculating a gradient according to the loss function by using the initial meta-evaluation network, and performing parameter update.

In some exemplary implementations of the present disclosure, the meta-evaluation network learning unit is configured to:
  input the output feature map of the replacement convolutional module into a classifier of the target neural network model to obtain a classification error;
  calculate a mean square error between the output feature map of the replacement convolutional module and an output feature map of the last convolutional module of the target neural network model; and
  determine the loss function according to the classification error and the mean square error.

In some exemplary implementations of the present disclosure, the apparatus further includes a metal-generative network learning unit, configured to control the initial meta-generative network to perform learning at the validation stage by following operations:
  performing forward inference by using the target neural network model to obtain an output feature map of a last convolutional module of the target neural network model;
  extracting a channel related feature from the output feature map of the last convolutional module of the target neural network model;
  inputting the extracted channel related feature and a current constraint condition into the initial meta-generative network;
  predicting an optimal network architecture under the current constraint condition by using the initial meta-generative network, and inputting the optimal network architecture into the initial meta-evaluation network; and
  acquiring a loss function of the optimal network architecture under the current constraint condition by using the initial meta-evaluation network, and backward transferring gradient information, so that the initial meta-generative network performs gradient computation and parameter update on parameters of the initial meta-generative network based on the gradient information.

In some exemplary implementations of the present disclosure, a network architecture of each of the target meta-evaluation network and the target meta-generative network contains two fully-connected layers, and an input layer of the target meta-generative network and an output layer of the target meta-evaluation network adopt a parameter sharing mechanism.

Corresponding to the above method embodiment, an embodiment of the present disclosure further provides a neural network compression device, including:
  a memory, configured to store a computer program; and
  a processor, configured to implement, when executing the computer program, the operations of the above neural network compression method.

Figure 12:
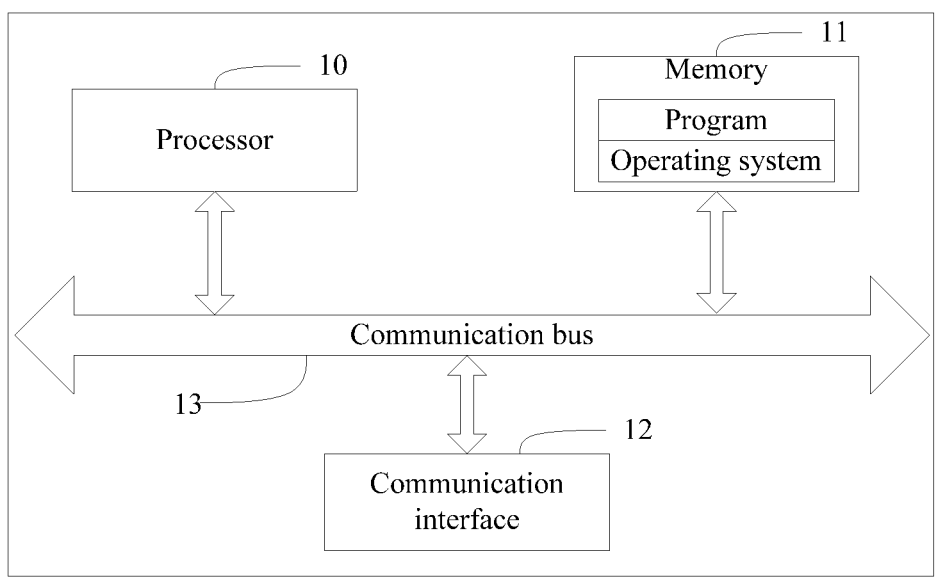
FIG. 12 is a schematic structural diagram of a neural network compression device in the embodiments of the present disclosure.

As shown in FIG. 12, a schematic structural diagram of constituents of the neural network compression device is shown. The neural network compression device may include: a processor 10, a memory 11, a communication interface 12, and a communication bus 13. The processor 10, the memory 11 and the communication interface 12 all complete mutual communications through the communication bus 13.

In the embodiments of the present disclosure, the processor 10 may be a Central Processing Unit (CPU), a specific-application integrated circuit, a digital signal processor, a FPGA, other programmable logic devices, or the like.

The processor 10 can invoke the program stored in the memory 11. In some exemplary implementations, the processor 10 can perform the operations in the embodiment of the neural network compression method.

The memory 11 is configured to store one or more programs. The program may include program codes which include computer operation instructions. In the embodiments of the present disclosure, the memory 11 at least stores programs for realizing the following functions:
  performing forward inference on target data by using a pre-trained target parameter sharing network to obtain an output feature map of a last convolutional module of the target parameter sharing network;
  extracting a channel related feature from the output feature map of the last convolutional module of the target parameter sharing network;
  inputting the extracted channel related feature and a target constraint condition into a target meta-generative network of a pre-trained target weakly supervised meta-learning framework; and predicting an optimal network architecture under the target constraint condition by using the target meta-generative network to obtain a compressed neural network model.

In one possible implementation, the memory 11 may include a program storage area and a data storage area. The program storage area may store an operating system, an application program required for at least one function (such as an image display function and a feature extraction function), and the like. The data storage area can store data created during use, such as feature map data and network architecture data.

In addition, the memory 11 may include a high-speed random access memory, and may further include a non-volatile memory, such as at least one magnetic disk storage device or other volatile solid-state storage devices.

The communication interface 12 may be an interface of a communication module for being connected with other devices or systems.

Of course, it should be noted that the structure shown in FIG. 12 does not constitute a limitation to the neural network compression device in the embodiment of the present disclosure. In practical applications, the neural network compression device may include more or fewer components than those shown in FIG. 12, or combine some components.

Corresponding to the above method embodiment, an embodiment of the present disclosure further provides a computer-readable storage medium which stores a computer program. The computer program, when executed by a processor, implements the operations of the above neural network compression method.

All the embodiments in this specification are described in a progressive manner. Contents mainly described in each embodiment are different from those described in other embodiments. Same or similar parts of all the embodiments refer to each other.

Professionals can further realize that in connection with the units and algorithm operations of all examples described in the embodiments disclosed herein, they can be implemented by electronic hardware, computer software or a combination of electronic hardware and computer software. In order to clearly describe the interchangeability of hardware and software, the constitutions and operations of all the examples have been generally described according to functions in the above illustration. Whether these functions are executed by hardware or software depends on the specific application and design constraints of the technical solution. Professionals and technicians can use different methods for each specific application to realize the described functions, but such implementation should not be considered as being beyond the scope of the present disclosure.

The operations of a method or algorithm described in conjunction with the embodiments disclosed herein may be directly implemented in hardware, a software module executed by a processor, or a combination of the hardware and the software module. The software module may be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

The principles and implementations of the present disclosure are described herein by using specific examples, and the descriptions of the above embodiments are only used to help understand the technical solutions of the present disclosure and the core ideas of the technical solutions. It should be pointed out that for those having ordinary skill in the art, without departing from the principle of the present disclosure, several improvements and modifications may also be made to the present disclosure, and these improvements and modifications also fall within the protection scope of the claims of the present disclosure.

What is claimed is:

1. A neural network compression method performed by a neural network compression device and used for implementing fast neural network compression with reduced computation load on the neural network compression device, comprising:
   performing forward inference on target data by using a pre-trained target parameter sharing network to obtain an output feature map of a last convolutional module of the pre-trained target parameter sharing network;
   extracting a channel related feature from the output feature map of the last convolutional module of the pre-trained target parameter sharing network;
   inputting the extracted channel related feature and a target constraint condition into a target meta-generative network of a pre-trained target weakly supervised meta-learning framework; and
   predicting an optimal network architecture under the target constraint condition by using the target meta-generative network to obtain a compressed neural network model.

2. The method according to claim 1, wherein the pre-trained target weakly supervised meta-learning framework comprises the target meta-generative network and a target meta-evaluation network connected with the target meta-generative network; and supervised information of the target meta-generative network is from gradient information of the target meta-evaluation network.

3. The method according to claim 2, wherein the pre-trained target parameter sharing network and the pre-trained target weakly supervised meta-learning framework are obtained by the following operations:
   determining a target neural network model and an initial weakly supervised meta-learning framework, wherein the initial weakly supervised meta-learning framework comprises an initial meta-evaluation network and an initial meta-generative network;
   controlling the target neural network model to perform learning at a training stage;
   controlling the initial meta-evaluation network and the initial meta-generative network to perform learning at a validation stage; and
   repeatedly performing the operations of controlling the target neural network model to perform learning at the training stage and controlling the initial meta-evaluation network and the initial meta-generative network to perform learning at the validation stage until a set first end condition is satisfied, so as to obtain the pre-trained target parameter sharing network and the pre-trained target weakly supervised meta-learning framework.

4. The method according to claim 2, wherein the pre-trained target parameter sharing network and the pre-trained target weakly supervised meta-learning framework are obtained by the following operations:
   determining a target neural network model and an initial weakly supervised meta-learning framework, wherein the initial weakly supervised meta-learning framework comprises an initial meta-evaluation network and an initial meta-generative network;

performing parameter sharing training on the target neural network model to obtain the pre-trained target parameter sharing network;

controlling the initial meta-evaluation network and the initial meta-generative network to perform learning at a validation stage; and repeatedly performing the operation of controlling the initial meta-evaluation network and the initial meta-generative network to perform learning at the validation stage until a set second end condition is satisfied, so as to obtain the pre-trained target weakly supervised meta-learning framework.

5. The method according to claim 3, wherein the initial meta-evaluation network is controlled to perform learning at the validation stage by the following operations:

generating a set of initial neural network architecture;

predicting a weight parameter of a last convolutional module of the target neural network model by using the initial meta-evaluation network according to the initial neural network architecture;

constructing a replacement convolutional module for the last convolutional module of the target neural network model by using the initial meta-evaluation network, wherein the replacement convolutional module takes a weight parameter predicted by the initial meta-evaluation network as a weight and takes input data of the last convolutional module of the target neural network model as an input;

determining a loss function using an output feature map of the replacement convolutional module; and calculating a gradient according to the loss function by using the initial meta-evaluation network, and performing parameter update.

6. The method according to claim 5, wherein determining the loss function using the output feature map of the replacement convolutional module comprises:

inputting the output feature map of the replacement convolutional module into a classifier of the target neural network model to obtain a classification error;

calculating a mean square error between the output feature map of the replacement convolutional module and an output feature map of the last convolutional module of the target neural network model; and determining the loss function according to the classification error and the mean square error.

7. The method according to claim 3, wherein the initial meta-generative network is controlled to perform learning at the validation stage by the following operations:

performing forward inference by using the target neural network model to obtain an output feature map of a last convolutional module of the target neural network model;

extracting a channel related feature from the output feature map of the last convolutional module of the target neural network model;

inputting the extracted channel related feature and a current constraint condition into the initial meta-generative network;

predicting an optimal network architecture under the current constraint condition by using the initial meta-generative network, and inputting the optimal network architecture into the initial meta-evaluation network; and acquiring a loss function of the optimal network architecture under the current constraint condition by using the initial meta-evaluation network and backward transferring gradient information so that the initial meta-generative network performs gradient computation and parameter update on parameters of the initial meta-generative network based on the gradient information.

8. The method according to claim 2, wherein a network architecture of each of the target meta-evaluation network and the target meta-generative network contains two fully-connected layers, and an input layer of the target meta-generative network and an output layer of the target meta-evaluation network adopt a parameter sharing mechanism.

9. The method according to claim 4, wherein the initial meta-evaluation network is controlled to perform learning at the validation stage by the following operations:

generating a set of initial neural network architecture;

predicting a weight parameter of a last convolutional module of the target neural network model by using the initial meta-evaluation network according to the initial neural network architecture;

constructing a replacement convolutional module for the last convolutional module of the target neural network model by using the initial meta-evaluation network, wherein the replacement convolutional module takes a weight parameter predicted by the initial meta-evaluation network as a weight and takes input data of the last convolutional module of the target neural network model as an input;

determining a loss function using an output feature map of the replacement convolutional module; and calculating a gradient according to the loss function by using the initial meta-evaluation network, and performing parameter update.

10. The method according to claim 9, wherein determining the loss function using the output feature map of the replacement convolutional module comprises:

inputting the output feature map of the replacement convolutional module into a classifier of the target neural network model to obtain a classification error;

calculating a mean square error between the output feature map of the replacement convolutional module and an output feature map of the last convolutional module of the target neural network model; and determining the loss function according to the classification error and the mean square error.

11. The method according to claim 4, wherein the initial meta-generative network is controlled to perform learning at the validation stage by the following operations:

performing forward inference by using the target neural network model to obtain an output feature map of a last convolutional module of the target neural network model;

extracting a channel related feature from the output feature map of the last convolutional module of the target neural network model;

inputting the extracted channel related feature and a current constraint condition into the initial meta-generative network;

predicting an optimal network architecture under the current constraint condition by using the initial meta-generative network, and inputting the optimal network architecture into the initial meta-evaluation network; and acquiring a loss function of the optimal network architecture under the current constraint condition by using the initial meta-evaluation network, and backward transferring gradient information, so that the initial meta-generative network performs gradient computation and parameter update on parameters of the initial meta-generative network based on the gradient information.

12. The method according to claim 1, wherein the channel related feature is a maximum value of the output feature map on each channel, wherein a maximum value of each feature submap after a feature map tensor of N input data is split along channel C to finally form an N*C*1-dimensional feature tensor.

13. The method according to claim 1, wherein the target constraint condition is upper and lower limits of a channel compression ratio of each layer corresponding to a Floating Point Operations Per second (FLOPs) limit or a latency limit.

14. The method according to claim 3, wherein the initial meta-generative network and the initial meta-evaluation network are trained alternately, and the training of the initial meta-generative network depends on the initial meta-evaluation network; and the training of the initial weakly supervised meta-learning framework is performed synchronously or asynchronously with the training of the target neural network model.

15. The method according to claim 4, wherein the initial meta-generative network and the initial meta-evaluation network are trained alternately, and the training of the initial meta-generative network depends on the initial meta-evaluation network; and the training of the initial weakly supervised meta-learning framework is performed synchronously or asynchronously with the training of the target neural network model.

16. A neural network compression device used for implementing fast neural network compression with reduced computation load on the neural network compression device, the neural network compression device comprising:
a memory, configured to store a computer program; and
a processor, when executing the computer program, configured to:
perform forward inference on target data by using a pre-trained target parameter sharing network to obtain an output feature map of a last convolutional module of the pre-trained target parameter sharing network;
extract a channel related feature from the output feature map of the last convolutional module of the pre-trained target parameter sharing network;
input the extracted channel related feature and a target constraint condition into a target meta-generative network of a pre-trained target weakly supervised meta-learning framework; and
predict an optimal network architecture under the target constraint condition by using the target meta-generative network to obtain a compressed neural network model.

17. The device according to claim 16, wherein the pre-trained target weakly supervised meta-learning framework comprises the target meta-generative network and a target meta-evaluation network connected with the target meta-generative network; and supervised information of the target meta-generative network is from gradient information of the target meta-evaluation network.

18. The device according to claim 17, wherein the processor is configured to obtain the pre-trained target parameter sharing network and the pre-trained target weakly supervised meta-learning framework by the following operations:

determining a target neural network model and an initial weakly supervised meta-learning framework, wherein the initial weakly supervised meta-learning framework comprises an initial meta-evaluation network and an initial meta-generative network;
controlling the target neural network model to perform learning at a training stage;
controlling the initial meta-evaluation network and the initial meta-generative network to perform learning at a validation stage; and
repeatedly performing the operations of controlling the target neural network model to perform learning at the training stage and controlling the initial meta-evaluation network and the initial meta-generative network to perform learning at the validation stage until a set first end condition is satisfied, so as to obtain the pre-trained target parameter sharing network and the pre-trained target weakly supervised meta-learning framework.

19. The device according to claim 17, wherein the processor is configured to obtain the pre-trained target parameter sharing network and the pre-trained target weakly supervised meta-learning framework by the following operations:
determining a target neural network model and an initial weakly supervised meta-learning framework, wherein the initial weakly supervised meta-learning framework comprises an initial meta-evaluation network and an initial meta-generative network;
performing parameter sharing training on the target neural network model to obtain the pre-trained target parameter sharing network;
controlling the initial meta-evaluation network and the initial meta-generative network to perform learning at a validation stage; and
repeatedly performing the operation of controlling the initial meta-evaluation network and the initial meta-generative network to perform learning at the validation stage until a set second end condition is satisfied, so as to obtain the pre-trained target weakly supervised meta-learning framework.

20. A non-transitory computer-readable storage medium, wherein the non-transitory computer-readable storage medium stores a computer program, and the computer program, when executed by a processor in a neural network compression device, implements the following operations used for implementing fast neural network compression with reduced computation load on the neural network compression device:
performing forward inference on target data by using a pre-trained target parameter sharing network to obtain an output feature map of a last convolutional module of the pre-trained target parameter sharing network;
extracting a channel related feature from the output feature map of the last convolutional module of the pre-trained target parameter sharing network;
inputting the extracted channel related feature and a target constraint condition into a target meta-generative network of a pre-trained target weakly supervised meta-learning framework; and
predicting an optimal network architecture under the target constraint condition by using the target meta-generative network to obtain a compressed neural network model.

* * * * *